Oct. 2, 1923.
R. E. ADREON ET AL
SLACK ADJUSTER
Filed July 19, 1922
1,469,571
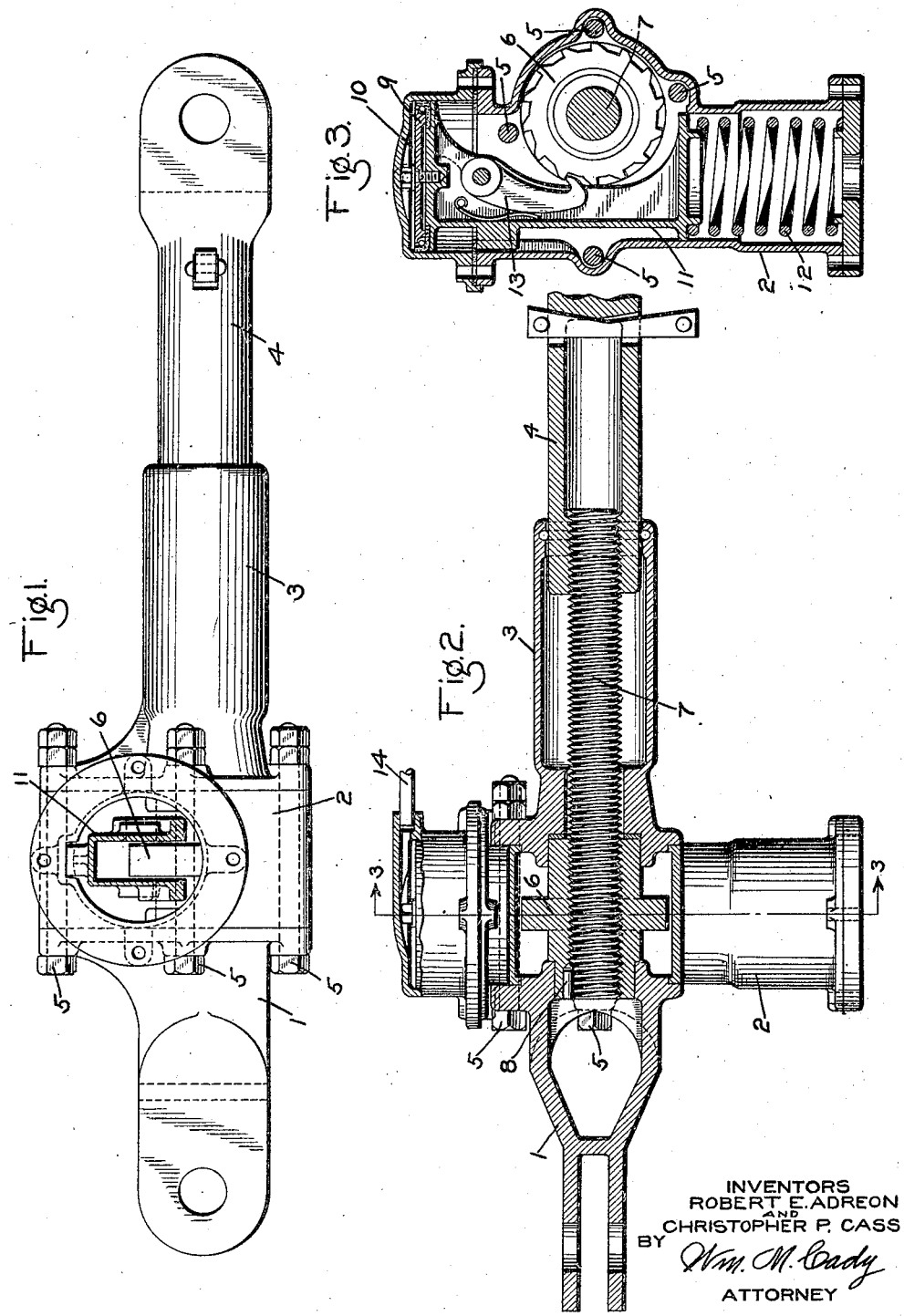
INVENTORS
ROBERT E. ADREON
AND
CHRISTOPHER P. CASS
BY
Wm. M. Cady
ATTORNEY Patented Oct. 2, 1923.

1,469,571

UNITED STATES PATENT OFFICE.

ROBERT E. ADREON, OF ST. LOUIS, MISSOURI, AND CHRISTOPHER P. CASS, OF BERKELEY, CALIFORNIA, ASSIGNORS TO THE AMERICAN BRAKE COMPANY, OF ST. LOUIS, MISSOURI, A CORPORATION OF MISSOURI.

SLACK ADJUSTER.

Application filed July 19, 1922. Serial No. 575,935.

*To all whom it may concern:*

Be it known that we, ROBERT E. ADREON and CHRISTOPHER P. CASS, citizens of the United States, residents, respectively, of St. Louis, State of Missouri, and Berkeley, in the county of Alameda, State of California, have jointly invented certain new and useful Improvements in Slack Adjusters, of which the following is a specification.

This invention relates to slack adjusters for taking up slack in the brake rigging due to the wear of the brake shoes on the wheels.

The principal object of our invention is to provide a slack adjuster in which the take-up cylinder is associated with and entirely supported by the tie rod which connects the brake levers.

In the accompanying drawing; Fig. 1 is a plan view, of a brake lever tie rod and associated take-up cylinder, with the cylinder cover removed, and constructed in accordance with our invention; Fig. 2 a side elevation thereof, partly in section; and Fig. 3. a section on the line 3—3 of Fig. 2.

As shown in the drawing, the construction may comprise a jaw casting 1 for pivotal connection to one brake lever, a take-up cylinder 2 fixed to said jaw casting 1, a sleeve member 3 fixed to the cylinder, and a jaw casting 4, pivotally connected to the opposite brake lever and adapted to telescope into the sleeve member 3. The jaw casting 1 and the sleeve member 3 may be secured to the take-up cylinder 2 by means of through bolts 5.

Mounted in the take-up cylinder 2 and in bearings provided in the jaw casting 1 and the sleeve member 3 is a ratchet wheel 6 which is secured to the end of an adjusting screw 7 by means of a key pin 8. The adjusting screw has screw-threaded engagement with the jaw casting 4, so that the rotation of the ratchet wheel 6 pulls the jaw casting 4 toward the left.

A piston 9 is mounted in piston chamber 10 of the cylinder 2 and carried by said piston is a stem member 11 which extends to the opposite side of the ratchet wheel 6 and serves as an abutment for a coil spring 12. Pivotally mounted on the stem 11 is a pawl 13 adapted to engage the teeth of ratchet wheel 6.

A flexible pipe 14 is connected to the piston chamber 10 and leads to a port in the brake cylinder.

In operation, when the fluid pressure brakes are applied, fluid is supplied to the brake cylinder, and if the stroke of the brake cylinder piston exceeds a predetermined amount, due to wear of the brake shoes, the brake cylinder port will be uncovered so that fluid under pressure is supplied to the piston chamber 10 and the piston 9 is shifted, causing the pawl 13 to engage a succeeding tooth of the ratchet wheel 6. When the brakes are released, fluid is exhausted from the piston chamber 10, permitting the spring 12 to move the piston rod and thereby the pawl 13 so that the ratchet wheel 6 is partially rotated by the pawl. The adjusting screw 7 rotates with the ratchet wheel 6 and therefore turns in the non-rotatable jaw casting 4, so that said jaw casting is moved toward the left, shortening the length of the tie rod and thus taking up the slack.

Having now described our invention, what we claim as new and desire to secure by Letters Patent, is:—

1. The combination with a pair of tie rod members, of a take-up cylinder fixed to one member, an adjusting screw having screw-threaded engagement with the other member, and a ratchet wheel mounted in said cylinder and fixed to said adjusting screw.

2. The combination with a pair of tie rod members, of a take-up cylinder fixed to one member, an adjusting screw having screw-threaded engagement with the other member, a ratchet wheel rotatably mounted in said cylinder and fixedly secured to said screw, and means for rotating said ratchet wheel and thereby said screw to cause a longitudinal movement of said screw engaged member.

In testimony whereof we have hereunto set our hands.

ROBERT E. ADREON.
CHRISTOPHER P. CASS.